United States Patent
Warner

(10) Patent No.: US 6,826,505 B1
(45) Date of Patent: Nov. 30, 2004

(54) SYSTEM AND METHOD FOR TESTING A COMMUNICATIONS SERVER

(75) Inventor: Andrew Warner, Edina, MN (US)

(73) Assignee: Digi International, Inc., Minnetonka, MN (US)

(*) Notice: Subject to any disclaimer, the term of this patent is extended or adjusted under 35 U.S.C. 154(b) by 283 days.

(21) Appl. No.: 09/627,262

(22) Filed: Jul. 28, 2000

(51) Int. Cl.[7] ............................................. G06F 9/455

(52) U.S. Cl. ....................... 702/118; 702/119; 702/123; 703/21

(58) Field of Search ............................. 702/118, 119, 702/120, 121, 122, 123; 714/33, 25, 43, 712, 713, 741, 821; 709/250; 706/108, 182, 183, 186, 188, 189, FOR 170, FOR 171, FOR 103, FOR 104, FOR 134, FOR 135; 703/20, 21, 13, 23–25; 375/222; 370/241, 242, 251, 252; 379/90.01, 93.01, 93.05, 93.07, 334, 900, 901

(56) References Cited

U.S. PATENT DOCUMENTS

| | | | | |
|---|---|---|---|---|
| 5,577,105 A | * | 11/1996 | Baum et al. | 379/93.05 |
| 5,828,468 A | * | 10/1998 | Lee et al. | 358/434 |
| 6,147,987 A | * | 11/2000 | Chau et al. | 370/352 |
| 6,195,359 B1 | * | 2/2001 | Eng et al. | 370/401 |
| 6,243,832 B1 | * | 6/2001 | Eckes et al. | 714/33 |
| 6,260,071 B1 | * | 7/2001 | Armistead et al. | 709/238 |
| 6,424,675 B1 | * | 7/2002 | Macdonald et al. | 375/222 |

FOREIGN PATENT DOCUMENTS

WO  WO 00/42750 A1 * 7/2000

OTHER PUBLICATIONS

Miller, Mark, "Ready to rope a remote access deal", Nov. 14, 1994, Network World, vol. 11, No. 46, pp. 66, 67, 71, 73, 75, 77, 79, 81, 86, 87.*
Molta et al., "Choose The Right Dial–Up Router For You", 1994, Network Computing, n 504, 150, 3 pages.*
"Digi Int'l Rolls Out Server–Based Remote Access To Asia Pac", Jun. 23, 1999, Asia Pulse, 3 pages.*
Shnier, Computer Dictionary, QUE a division of Macmillan Computer Publishing, 1998, p. 618.*
"Procedures for starting sessions of data transmission over the public switched telephone network", *ITU–T Recommendation V.8* (*Nov. 2000*)—*International Telecommunication Union—Series V: Data Communication Over the Telephone Network*, Geneva, 2001, (2001), 19 pages.
"Procedures for the identification and selection of common modes of operation between data circuit–terminating equipments (DCEs) and between data terminal equipments (DTEs) over the public switched telephone network and on leased point–to–point telephone–type", *ITU–T Recommendation V.8 bis* (*Nov. 2000*)—*International Telecommunication Union*, Geneva, 2001, (2001), 54 pages.
"Series V: Data Communication Over The Telephone Network—Simultaneous transmission of data and other signals", *Internal Telecommunication Union*, ITU–T Telecommunication Standardization Sector of ITU, pp. 1–51, (1998).

* cited by examiner

*Primary Examiner*—Hal Wachsman
(74) *Attorney, Agent, or Firm*—Schwegman, Lundberg, Woessner & Kluth, P.A.

(57) ABSTRACT

A system and method of testing a bank of modems. A test bed includes a RAS concentrator, wherein the RAS concentrator includes means for spoofing operation of a plurality of analog modems. The RAS concentrator is connected to a communication server having one or more concentrators or a bank of modems. Software is executed in the test bed to establish a plurality of simultaneously connections between the RAS concentrator and the bank of modems.

12 Claims, 6 Drawing Sheets

| START | B0 | B1 | B2 | B3 | B4 | B5 | B6 | B7 | STOP | CATEGORY OCTETS (B4=0) WITH CATEGORY GIVEN BY TAG B0-B3 |
|---|---|---|---|---|---|---|---|---|---|---|
| 0 | 1 | 0 | 0 | 0 | 0 | X | X | X | 1 | CALL FUNCTION |
| 0 | 1 | 0 | 1 | 0 | 0 | X | X | X | 1 | MODULATION MODES |
| 0 | 0 | 0 | 0 | 1 | 0 | X | X | X | 1 | PROTOCOLS |
| 0 | 1 | 1 | 1 | 1 | 0 | X | X | X | 1 | PSTN ACCESS |
| 0 | 1 | 1 | 1 | 1 | 0 | X | X | X | 1 | NON-STANDARD FACILITIES |
| 0 | 0 | 0 | 1 | 0 | 0 | X | X | X | 1 | FOR USE BY THE TELECOMMUNICATIONS INDUSTRIES ASSOCIATION (USA) |
| 0 | 1 | 1 | 1 | 0 | 0 | X | X | X | 1 | V.90 AVAILABILITY |

Fig. 4 (Prior Art)

| 8 | 7 | 6 | 5 | 4 | 3 | 2 | 1 | SPAR(1)S |
|---|---|---|---|---|---|---|---|---|
| X | X | X | X | X | X | X | 1 | NETWORK TYPE (NOTE) |
| X | X | X | X | X | X | 1 | X | RESERVED FOR ALLOCATION BY THE ITU-T |
| X | X | X | X | X | 1 | X | X | RESERVED FOR ALLOCATION BY THE ITU-T |
| X | X | X | X | 1 | X | X | X | RESERVED FOR ALLOCATION BY THE ITU-T |
| X | X | X | 1 | X | X | X | X | RESERVED FOR ALLOCATION BY THE ITU-T |
| X | X | 1 | X | X | X | X | X | RESERVED FOR ALLOCATION BY THE ITU-T |
| X | 1 | X | X | X | X | X | X | RESERVED FOR ALLOCATION BY THE ITU-T |
| 0 | 0 | 0 | 0 | 0 | 0 | 0 | 0 | NO PARAMETERS SET IN THIS OCTET |

NOTE- THE ABSENCE OF A BINARY ONE IN THIS BIT POSITION INDICATES THAT THE DCE IS CONNECTED TO AN ANALOGUE PSTN CONNECTION

Fig. 5 (Prior Art)

| 8 | 7 | 6 | 5 | 4 | 3 | 2 | 1 | NETWORK TYPE NPAR(2)S |
|---|---|---|---|---|---|---|---|---|
| X | X | X | X | X | X | X | 1 | CELLULAR ACCESS |
| X | X | X | X | X | X | 1 | X | ISDN ACCESS |
| X | X | X | X | X | 1 | X | X | DIGITALPS TN ACCESS (NOTE) |
| X | X | X | X | 1 | X | X | X | RESERVED FOR ALLOCATION BY THE ITU-T |
| X | X | X | 1 | X | X | X | X | RESERVED FOR ALLOCATION BY THE ITU-T |
| X | X | 1 | X | X | X | X | X | NON-STANDARD NETWORK |
| X | X | 0 | 0 | 0 | 0 | 0 | 0 | NO PARAMETERS SET IN THIS OCTET |
| NOTE- THIS BIT IS SET TO BINARY ONE TO INDICATE DIGITAL PSTN ACCESS, OTHER THAN ISDN, WHERE THE DCE DELIVERS DIGITALLY ENCODED ANALOGUE CONTENT TO THE NETWORK. ||||||||||

*Fig. 6 (Prior Art)*

| 8 | 7 | 6 | 5 | 4 | 3 | 2 | 1 | DATA NPAR(2)S |
|---|---|---|---|---|---|---|---|---|
| X | X | X | X | X | X | X | 1 | REC. V.32 |
| X | X | X | X | X | X | 1 | X | REC. V.22 BIS |
| X | X | X | X | X | 1 | X | X | REC. V.22 |
| X | X | X | X | 1 | X | X | X | REC. V.21 |
| X | X | X | 1 | X | X | X | X | V.90 ANALOGUE MODEM |
| X | X | 1 | X | X | X | X | X | V.90 DIGITAL MODEM (NOTE) |
| X | X | 0 | 0 | 0 | 0 | 0 | 0 | NO PARAMETERS IN THIS OCTET |
| NOTE- A DIGITAL V.90 MODEM CANNOT OPERATE ON AN ANALOGUE PSTN CONNECTION. ||||||||||

*Fig. 7 (Prior Art)*

SYSTEM AND METHOD FOR TESTING A COMMUNICATIONS SERVER

FIELD OF THE INVENTION

The present invention is related to the testing of communication devices, and more particularly to a system and method for testing communications servers capable of establishing a plurality of simultaneous modem connections.

BACKGROUND INFORMATION

The Internet has created additional demand for communication services. At first, Internet service providers met this demand by installing banks of modems. This approach was inefficient, unreliable and costly. With the advent of telecommunications standards such as V.90, it has been possible to build dense communications servers which consolidate functions in fewer boxes, make more efficient use of pooled devices and allocate ports to different applications dynamically as they are needed.

Remote Access Server (RAS) concentrators have been developed by companies like Digi International of Minnetonka, Minn. to receive incoming connections from, for example, branch offices and telecommuters. These products aggregate or concentrate up to 30 simultaneous analog (K56flex or V.90) or digital (ISDN) connections onto one T1, E1 or ISDN Primary Rate Interface (PRI) line. One of Digi's single PCI slot products, the DataFire RAS 60, can handle as many as 60 simultaneous high-density modem channels or ISDN B channel connections over two T1/E1/PRI lines.

Testing collections of concentrators can be difficult. For instance, a large Internet Service providers may be configured to handle ten thousand simultaneous analog or digital connections. Testing of such systems under load requires that one make ten thousand simultaneous connections. In the past such a test would require a bank of ten thousand analog or digital modems. Such an approach is cumbersome, unreliable and costly.

What is needed is a system and method for testing communication systems which support large numbers of simultaneous connections without the need for individual modems.

SUMMARY OF THE INVENTION

According to one aspect of the present invention, a system and method of testing a bank of modems is described. A test bed includes a RAS concentrator, wherein the RAS concentrator includes means for spoofing operation of a plurality of modems. The RAS concentrator is connected to a communication server having one or more concentrators or a bank of modems. Software is executed in the test bed to establish a plurality of simultaneous connections between the RAS concentrator and the bank of modems.

According to another aspect of the present invention, a system for testing a communications server which provides a plurality of simultaneous modem connections includes a communications medium, a processor and a RAS concentrator connected to the processor and the communications medium. The RAS concentrator includes a signal processor for managing a plurality of modem connections and a communications interface connected to the signal processor and the communications medium, wherein the signal processor operates under program control to spoof individual modem connections across the communications medium.

According to yet another aspect of the present invention, a system for testing a communications server which provides a plurality of simultaneous modem connections includes a Public Switched Telephone Network, a processor and a RAS concentrator connected to the processor and the Public Switched Telephone Network. The RAS concentrator includes a signal processor for managing a plurality of modem connections and a Public Switched Telephone Network interface connected to the signal processor and the Public Switched Telephone Network, wherein the signal processor operates under program control to spoof individual modem connections across the Public Switched Telephone Network (PSTN) interface.

According to yet another aspect of the present invention, a RAS concentrator includes a processor and a Public Switched Telephone Network (PSTN) interface connected to the processor. The processor operates under program control to spoof individual modem connections across the Public Switched Telephone Network (PSTN) interface.

According to yet another aspect of the present invention, a RAS concentrator adapter includes a processor, a computer interface and a Public Switched Telephone Network (PSTN) interface connected to the processor. The processor operates under program control to spoof individual modem connections across the Public Switched Telephone Network (PSTN) interface. The computer interface is capable of communicating with a computer.

BRIEF DESCRIPTION OF THE DRAWINGS

FIG. 4 illustrates information categories in V.8 which are modified during analog spoof mode;

FIGS. 5–7 illustrate identification fields in V.8bis which are modified during analog spoof mode.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Figure 1:
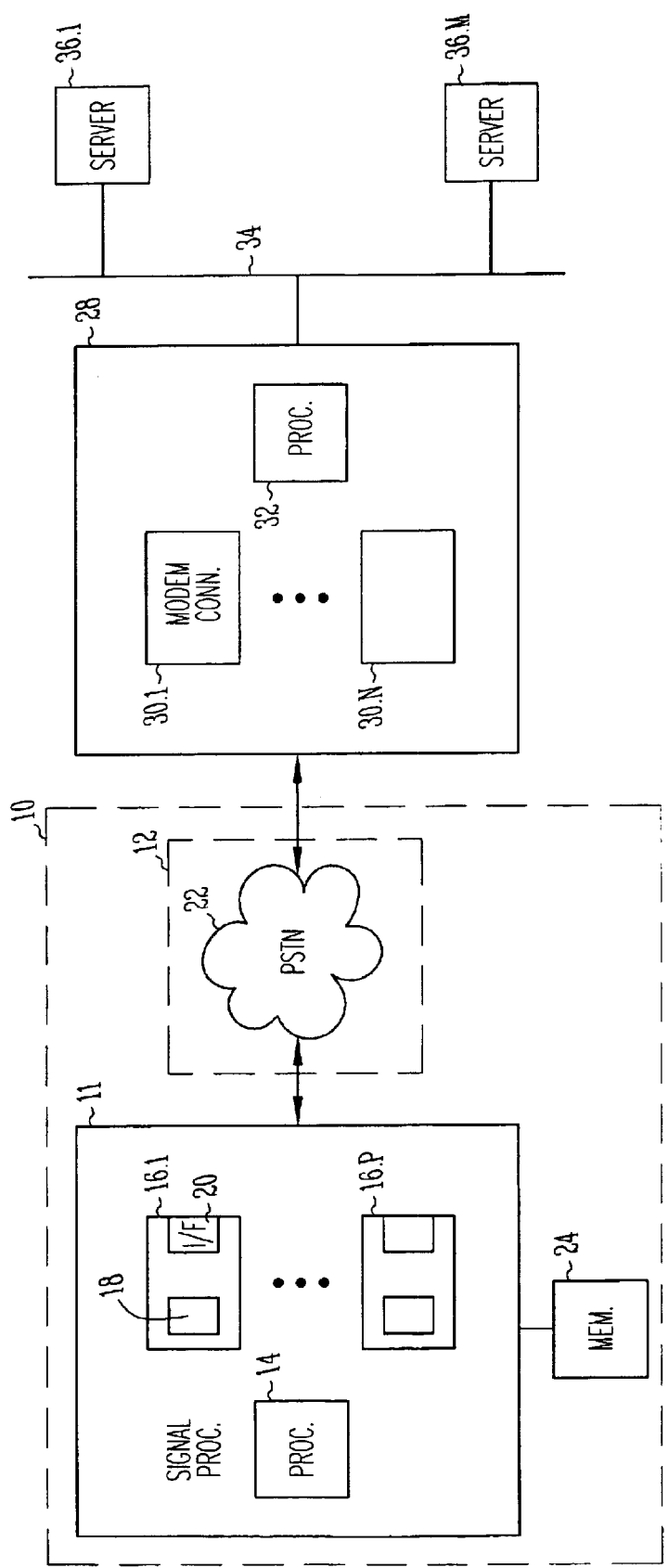
FIG. 1 illustrates a system for testing a communications server.

A system for testing a communications server is shown in FIG. 1. As shown in FIG. 1, a communications server 28 provides a number of simultaneous modem connections 30 (shown as 30.1 through 30.N) to a communications medium such as a Public Switched Telephone Network. In one embodiment, modem connections 30.1 through 30.N are individual modems and communications server 28 is a bank of modems. In another embodiment, modem connections 30.1 through 30.N are provided by one or more RAS concentrators in a manner known in the art.

In one embodiment, communications server 28 includes a processor 32 which communicates over a network 34 to one or more servers 36 (shown as 36.1 through 36.M). In one such embodiment, servers 36 are file servers. Servers 36 could also be Web servers, print servers, etc.

In the embodiment shown in FIG. 1, communications server test system 10 includes a communications medium 12 and a test bed 11. Test bed 11 includes a processor 14 and a RAS concentrator 16. RAS concentrator 16 is connected to processor 14 and to communications medium 12 and includes a signal processor 18 for managing a plurality of modem connections and a communications interface 20. Communications interface 20 is connected to signal processor 18 and to communications medium 12. Signal processor 18 operates under program control to spoof individual modem connections across communications medium 12 in the manner to be described below.

In the embodiment shown in FIG. 1, test system 10 also includes a device 24 connected to test bed 11. Device 24 is capable of receiving and reading articles comprising computer readable media. Examples of articles comprising computer readable media are floppy disks, hard drives, CD-ROM or DVD media or any other read-write or read-only memory device.

In the embodiment shown in FIG. 1, communications medium 12 includes a Public Switched Telephone Network 22.

Figure 2:
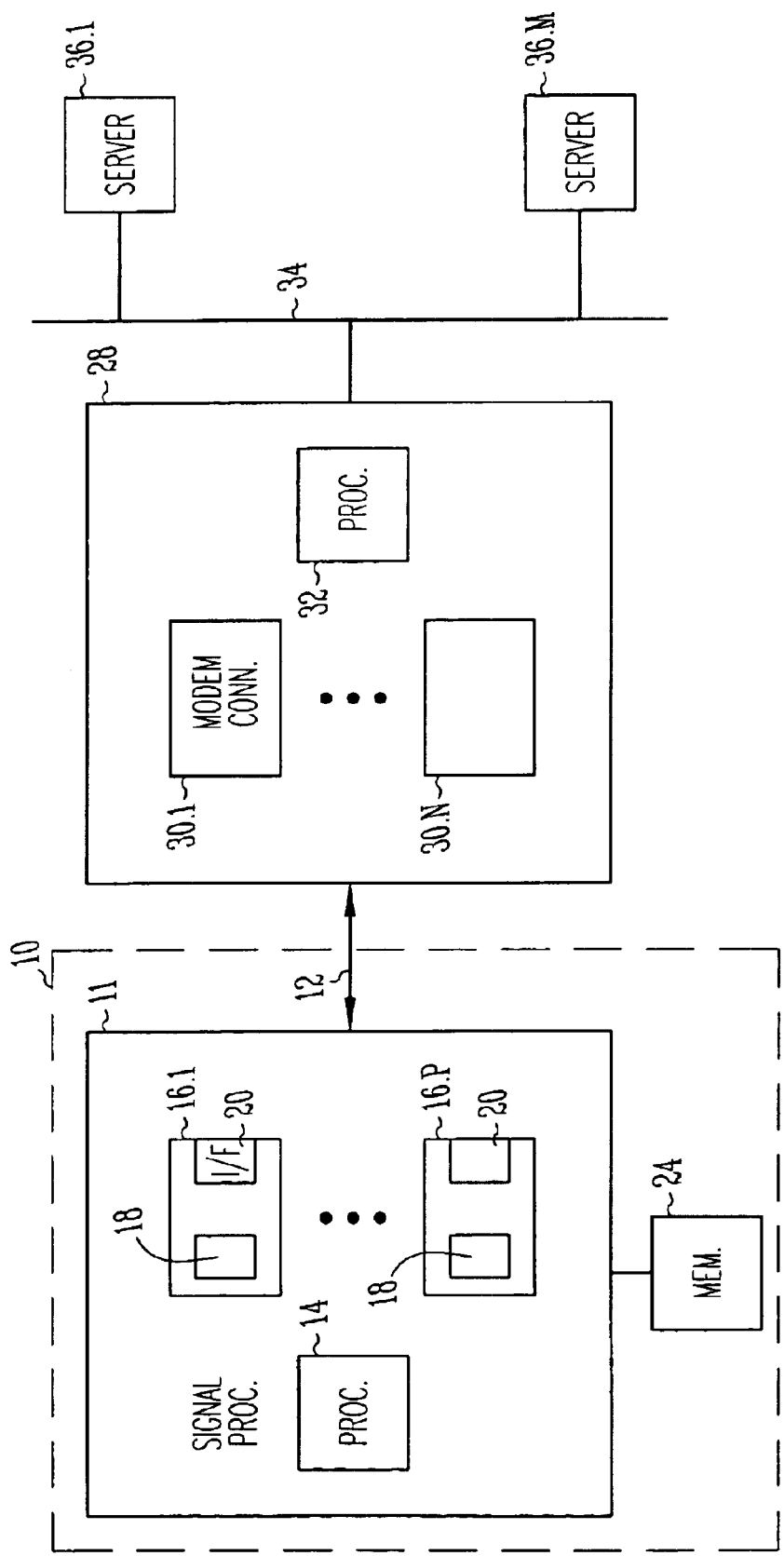
FIG. 2 illustrates another system for testing a communications server.

Another embodiment of a system 10 for testing a communications server is shown in FIG. 2. As in FIG. 1, in the embodiment shown in FIG. 2, communications server test system 10 includes a communications medium 12 and a test bed 11. Test bed 11 includes a processor 14 and a RAS concentrator adapter 16. RAS concentrator adapter 16 is connected to processor 14 and to communications medium 12 and includes a signal processor 18 for managing a plurality of modem connections and a communications interface 20. Communications interface 20 is connected to signal processor 18 and to communications medium 12. Signal processor 18 operates under program control to spoof individual modem connections across communications medium 12 in the manner to be described below. In this embodiment, however, test bed 11 is connected directly to communications server 28 via a connection such as ISDN PRI, T1 or E1.

In the embodiment shown in FIG. 2, test system 10 also includes a device 24 connected to test bed 11. Device 24 is capable of receiving and reading articles comprising computer readable media. Examples of articles comprising computer readable media are floppy disks, hard drives, CD-ROM or DVD media or any other read-write or read-only memory device.

Figure 3:
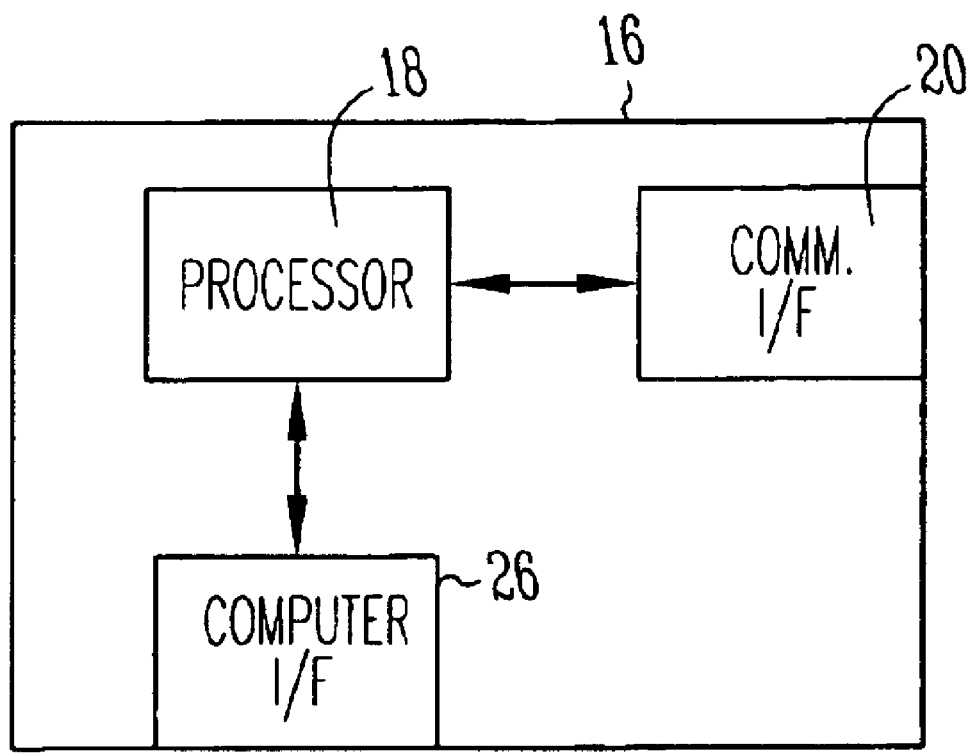
FIG. 3 illustrates an RAS concentrator adapter according to the present invention.

In one embodiment, RAS concentrator 16 is an adapter card which plugs into a computer. Such an embodiment is shown in FIG. 3. In FIG. 3, concentrator 16 includes a computer interface 26 such that concentrator 16 can be plugged into a computer motherboard. In such an embodiment, processor 18 includes program code for operating in analog spoof mode as is discussed below.

In one embodiment, test bed 11 is connected to communications medium 12 via a digital interface. In one such embodiment, a four wire interface is used so that echo cancellation can be disabled. Such a connection also permits the highest possible connection speeds for more thorough testing.

Each RAS concentrator 16 is digitally connected but must be able to spoof an analog modem. In one embodiment, a V.90 or K56flex modem-based communications server 28 is tested by spoofing communication server 28 during either V.8 or V.8bis connection negotiations.

In one V.8 embodiment, the Call Menu signal (CM) or the Joint Menu signal (JM) is manipulated to reflect a predefined set of options. Signals CM and JM enable Data Circuit-terminating Equipments (DCEs) to choose the best V-Series modulation mode from those available in both the call and answer DCEs. The CM/JM exchange also provides for protocol selection, PSTN access indication, and non-standard facilities.

Signals CM and JM use a common coding format. This coding format, and the whole of the V.8 protocol, is described in ITU-T Recommendation V.8, available from the International Telecommunication Union, which descriptions are incorporated herein by reference. Each signal consists of a repeated sequence of bits, with some of the bits used for synchronization and others for transmitting information. Some of the information categories defined for V.8 are shown in FIG. 4.

In one embodiment, the information categories used to spoof modem connections across communications medium 12 are modulation mode 40, V.90 availability 42 and PSTN access 44. Modulation mode 40 is set to indicate V.90 availability (b5=1). V.90 Availability 42 is configured such that V.90 analogue modem availability is indicated (b5=1) but V.90 digital modem availability is not indicated (b6=0). PSTN Access 44 is configured to show that test bed 11 is using an analogue network connection indicated (b7=0). Once the appropriate CM or JM signal is transmitted, training proceeds in an ordinary fashion.

In one V.8bis embodiment, one or more of the Capabilities List (CL), Mode Select (MS), and Capabilities List Request (CLR) messages is manipulated to reflect the following set of options:

Identification Field {SPar(1)} (see FIG. 5):
  Network type indicated as analogue (b1=0)
Identification Field {NPar(2)} [see FIG. 6]:

No parameters set (b1–b6=0)

Standard Info Field—Data{NPar(2)} —Octet 3 (see FIG. 7):

V.90 analogue modem indicated (b5=1)

V.90 digital modem not indicated (b6=0)

The V.8bis protocol is described in ITU-T Recommendation V.8bis, available from the International Telecommunication Union, which description is incorporated herein by reference.

Analogous techniques can be used for other PCM-based asymmetric modulations schemes such as K56Flex.

The above selections would not normally be made by a digitally connected PCM modem. Therefore, each concentrator 16 must include firmware which permits the selection and a mechanism which overrides the defaults for the above values.

Figure 8:
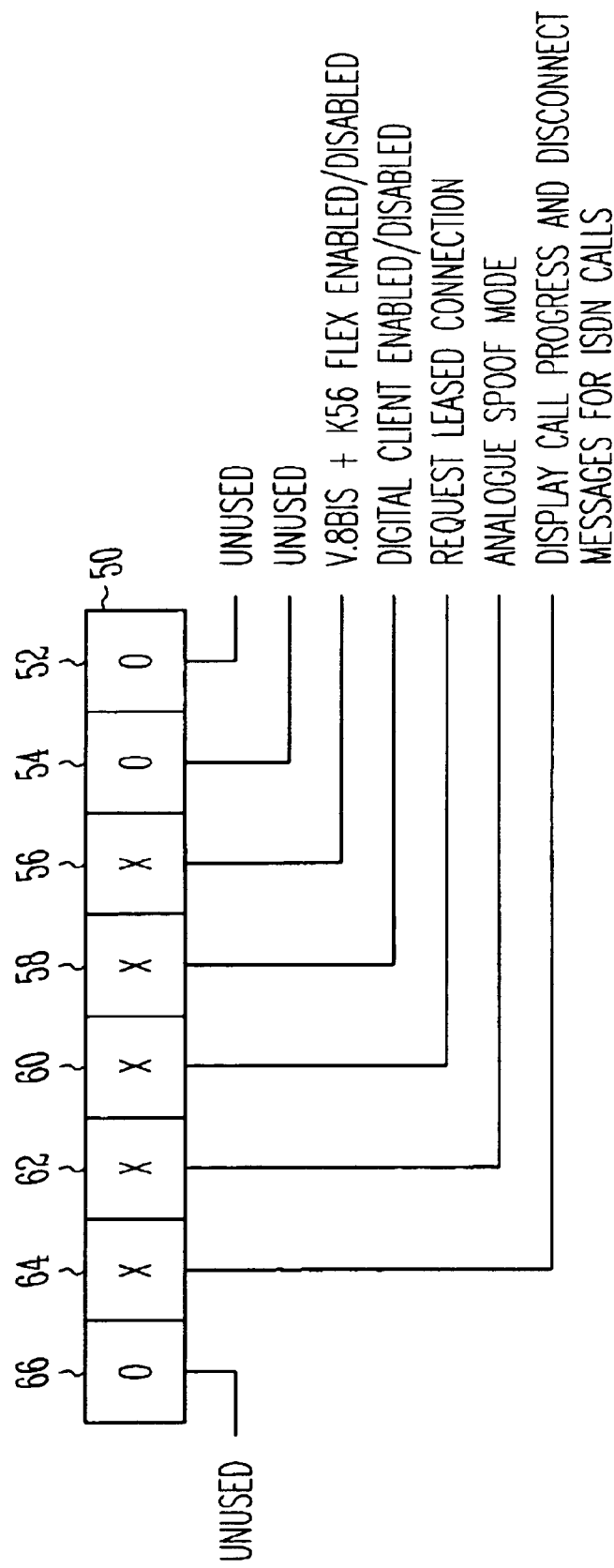
FIG. 8 shows one embodiment of a bitmap register used to control analog spoof mode in one embodiment of the present inventions.

In one embodiment, test bed 11 includes a bitmap register 50 that controls several options. Such a register 50 is shown in FIG. 8. In one embodiment, register 50 is an eight bit register having the following bit fields. Fields 52 and 54 are unused and set to zero. Field 56 is used to disable V.8bis and K56flex (a logic "0" enables V.8bis and K56flex while a logic "1" disables V.8bis and K56flex). Field 58 enables the digital V.90 client (a logic "0" disables the digital V.90 client while a logic "1" enables the digital V.90 client). Field 60 determines if the concentrator requests a leased connection from the signaling subsystem ("0" is normal operation, "1" is a request).

In one embodiment, field 60 is set/cleared automatically by AT&LL command but it may be subsequently modified for testing purposes.

Field 62 selects analog spoof mode for digital modems ("0" is normal operation, "1" tells concentrator 16 to enter an analog spoof mode where concentrator 16 lies during V.8/V.8bis about its capabilities and pretends to have an analog connection to communications medium 12. This mode is most useful when combined with field 58="1" above.

Field 64 tells concentrator 16 to display call progress and disconnect messages for ISDN calls ("0" is normal operation, "1" tells concentrator 16 to display call progress and disconnect messages for ISDN calls. Field 66 is unused and is set to zero.

In one embodiment, the default value for register 50 is 8 (all fields but field 58 set to zero). In another embodiment, the default value for register 50 is 0 (all fields set to zero).

In one embodiment, data pump modulation and negotiation coded can be obtained from Vocal Technologies of West lake Village, Calif. In one such embodiment, the code includes hooks that allow register 60 to be mapped by software on the appropriate fields of the V.8 or V.8bis specification as discussed above. Once the modes of operation are established, training continues as described in the V.90P specification.

CONCLUSION

The test approach discussed above simplifies management of the test. In contrast to analog testing in the past, one can now look at the digital lines. In addition, the approach permits the highest possible connection speeds and eliminates the need for echo cancellation or suppression. Analog spoof mode is used to make the device under test think it is communicating with a number of individual analog modems, permitting the testing of communication servers at the highest speed and under the greatest load. Concentrators are used to simplify the test bed, increasing reliability and lowering cost.

In the above discussion, the term "computer" is defined to include any digital or analog data processing unit. Examples include any personal computer, workstation, set top box, mainframe, server, supercomputer, laptop or personal digital assistant capable of embodying the inventions described herein.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of testing a bank of modems, comprising:

providing a test bed having a Remote Access Server (RAS) concentrator, wherein the RAS concentrator includes means for spoofing operation of a plurality of modems;

connecting the RAS concentrator to the bank of modems; and executing software in the test bed to establish a plurality of simultaneous connections between the RAS concentrator and the bank of modems.

2. The method of claim 1, wherein connecting includes connecting the RAS concentrator to the bank of modems across a Public/Switched Telephone Network (PSTN) and wherein executing includes establishing each connection across the Public Switched Telephone Network.

3. The method of claim 1, wherein connecting includes connecting the RAS concentrator to the bank of modems across a Public Switched Telephone Network (PSTN), wherein the RAS concentrator connects to the PSTN via an Integrated Services Digital Network (ISDN) Primary Rate Interface.

4. In a communications server having a remote access server (RAS) concentrator for communicating with a plurality of modems across a communications medium, a method of testing the communications server, comprising:

providing a test bed having a second RAS concentrator, wherein the second RAS concentrator includes means for spoofing operation of a plurality of modems;

connecting the second RAS concentrator to the communications server under test; and executing software in the test bed to establish a plurality of simultaneous connections between the second RAS concentrator and the RAS concentrator within the communications server under test.

5. The method of claim 4, wherein the communications medium is a Public Switched Telephone Network (PSTN);

wherein connecting includes connecting each of the RAS concentrators to the Public Switched Telephone Network (PSTN) and wherein executing includes establishing each simultaneous connection across the Public Switched Telephone Network.

6. The method of claim 4, wherein the communications medium is a Public Switched Telephone Network (PSTN) having a first and a second Integrated Services Digital Network (ISDN) Primary Rate Interface (PRI);

wherein connecting includes connecting the second RAS concentrator and the RAS concentrator under test to the Public Switched Telephone Network (PSTN) via the first and second ISDN Primary Rate Interface, respectively, and wherein executing includes establishing an ISDN PRI connection across the Public Switched Telephone Network.

7. A Remote Access Server (RAS) concentrator, comprising:
  a processor; and
  a Public Switched Telephone Network (PSTN) interface connected to the processor, wherein the processor includes program code for spoofing individual analog modem connections across the Public Switched Telephone Network (PSTN) interface.

8. A Remote Access Server (RAS) concentrator adapter, comprising:
  a processor;
  a computer interface in communication with the processor, wherein the computer interface is adaptable for communicating with a computer; and
  a Public Switched Telephone Network (PSTN) interface connected to the processor, wherein the processor includes program code for spoofing individual analog modem connections across the Public Switched Telephone Network (PSTN) interface.

9. The RAS concentrator adapter of claim 8, wherein the RAS concentrator adapter plugs into a computer motherboard.

10. A system for testing a communications server, wherein the communications server provides a plurality of simultaneous modem connections, the system comprising:
  a Public Switched Telephone Network;
  a processor; and
  a Remote Access Server (RAS) concentrator connected to the processor and the Public Switched Telephone Network, wherein the RAS concentrator includes:
    a signal processor for managing a plurality of modem connections; and
    a Public Switched Telephone Network interface connected to the signal processor and the Public Switched Telephone Network, wherein the signal processor includes program code for spoofing individual analog modem connections across the Public Switched Telephone Network (PSTN) interface.

11. A system for testing a communications server, wherein the communications server provides a plurality of simultaneous modem connections, the system comprising:
  a communications medium;
  a processor; and
  a Remote Access Server (RAS) concentrator connected to the processor and the communications medium, wherein the RAS concentrator includes:
    a signal processor for managing a plurality of modem connections; and
    a communications interface connected to the signal processor and the communications medium, wherein the signal processor includes program code for spoofing individual analog modem connections across the communications medium.

12. The system according to claim 11, wherein the communications medium includes a Public Switched Telephone Network.

\* \* \* \* \*

UNITED STATES PATENT AND TRADEMARK OFFICE
CERTIFICATE OF CORRECTION

PATENT NO. : 6,826,505 B1
DATED : November 30, 2004
INVENTOR(S) : Warner

It is certified that error appears in the above-identified patent and that said Letters Patent is hereby corrected as shown below:

Title page,
Item [56], References Cited, OTHER PUBLICATIONS, "Procedures for starting sessions…." reference, delete "(2001)," before "19 pages".
"Procedures for the identification…." reference, delete "(2001)," before "54 pages".
*Primary Examiner*, delete "Hal Wachsman" and insert -- Hal D Wachsman --, therefor.
Item [57], ABSTRACT,
Line 7, delete "simultaneously" and insert -- simultaneous --, therefor.

Column 1,
Line 29, delete "DataFire" and insert -- Data Fire --, therefor.

Column 5,
Line 55, delete "V.90P" and insert -- V.90p --, therefor.

Column 7,
Line 4, delete "PSIN" and insert -- PSTN --, therefor.

Column 8,
Line 28, delete "claim 1I" and insert -- claim 11 --, therefor.

Signed and Sealed this

First Day of March, 2005

JON W. DUDAS
*Director of the United States Patent and Trademark Office*